United States Patent [19]
Tucker

[11] 3,913,737
[45] Oct. 21, 1975

[54] FILM CARTRIDGE
[75] Inventor: Archie J. Tucker, Rochester, N.Y.
[73] Assignee: Eastman Kodak Company, Rochester, N.Y.
[22] Filed: Apr. 30, 1974
[21] Appl. No.: 465,455

[52] U.S. Cl. ............... 206/408; 206/409; 206/814; 242/55.19 A
[51] Int. Cl.² ................... B65D 85/67; B65H 17/48
[58] Field of Search ......... 206/53, 54, 55, 408, 409, 206/814; 242/71.1, 194, 55.19 A; 352/72, 78 R

[56]   References Cited
   UNITED STATES PATENTS
| | | | |
|---|---|---|---|
| 258,300 | 5/1882 | Holland | 206/55 |
| 1,086,472 | 2/1914 | Schulz | 206/54 |
| 2,922,642 | 1/1960 | Cousino | 242/55.19 A |
| 2,951,654 | 9/1960 | Steelman | 242/55.19 A |
| 3,089,585 | 5/1963 | Seff | 206/53 |
| 3,810,594 | 5/1974 | Gersch et al | 242/194 |

*Primary Examiner*—William I. Price
*Assistant Examiner*—Steven E. Lipman
*Attorney, Agent, or Firm*—D. D. Schaper

[57]   ABSTRACT

A film cartridge loaded in the conventional manner with a roll of motion picture film having a magnetic stripe on one surface of the film will clockspring in a radial direction and undergo displacement of some convolutions of the film in a direction parallel to the axis of the film roll if subjected to shaking or impacts during handling of the cartridge prior to use in a camera. When this occurs, friction between the displaced convolution and the adjacent convolutions of the film effectively prevents return of the stepped convolution to its original position. Subsequently, when film is to be pulled from the supply roll during operation of a camera or similar device in which the cartridge is positioned, the stepped convolutions can contact a wall of the cartridge defining the supply chamber in the cartridge and produce a frictional force that opposes normal unwinding of the film. This can result in improperly exposed film. This film stepping problem can be avoided by use of a pull tab which occupies the space between the film in the supply chamber and the cartridge cover and which is removed from the cartridge just prior to insertion of the cartridge in a camera.

4 Claims, 4 Drawing Figures

U.S. Patent  Oct. 21, 1975  3,913,737
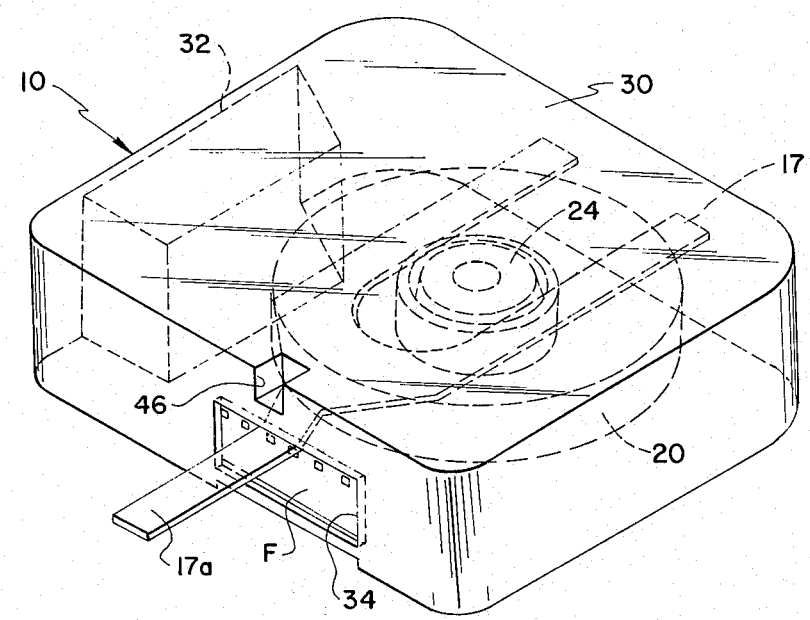
FIG. 1
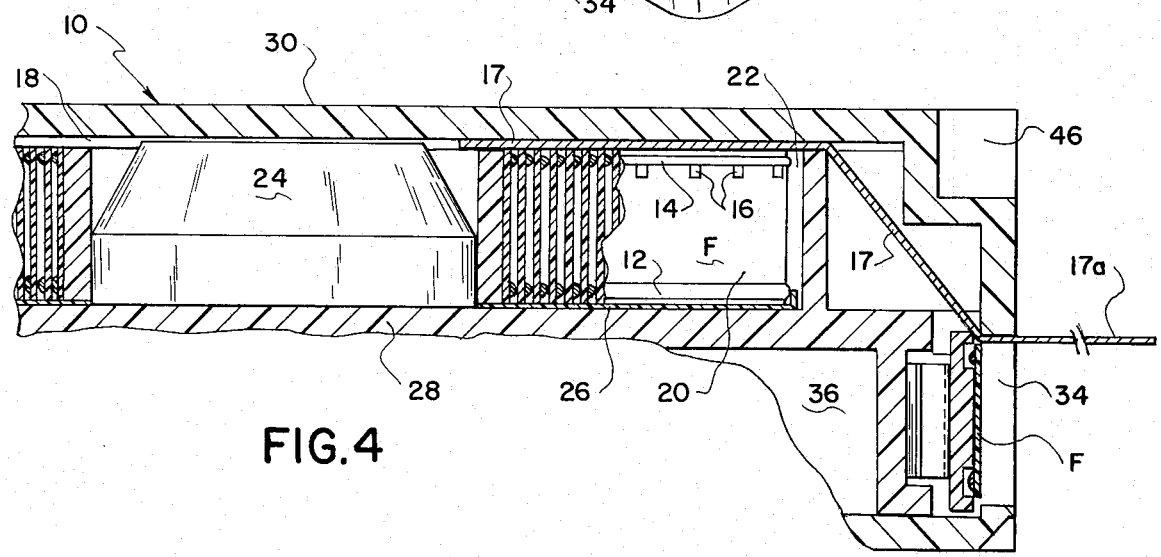
FIG. 4
FIG. 3
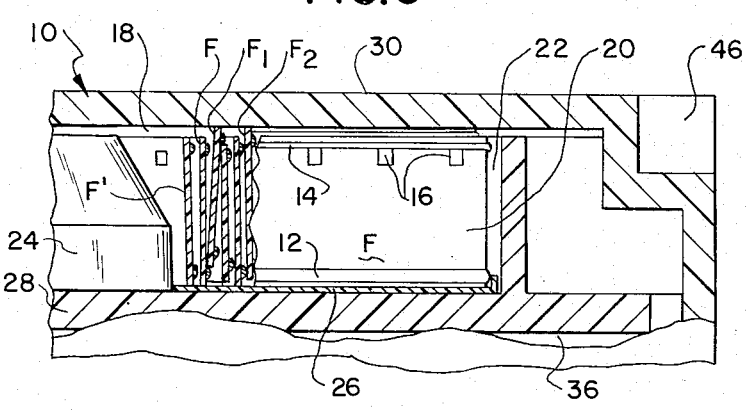
FIG. 2
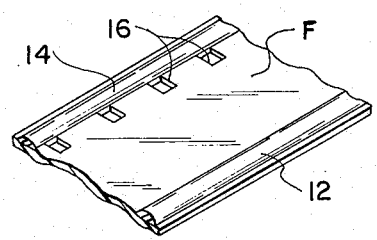

FILM CARTRIDGE

CROSS-REFERENCE TO RELATED APPLICATION

Reference is made to the commonly assigned copending U.S. Patent application Ser. No. 336,142 filed Feb. 26, 1973 in the names of Stephen H. Miller et al entitled Film Cartridge, now U.S. Pat. No. 3,858,968.

BACKGROUND OF THE INVENTION

1. Field of the Invention

This invention relates to film cartridges of the type used in motion picture cameras and the like and, more particularly, to such a film cartridge adapted to receive a roll of motion picture film having a sound stripe on one surface of the film which projects from such surface.

2. Description of the Prior Art

Commonly assigned U.S. Pat. No. 3,208,686 entitled Film Cartridge, issued Sept. 28, 1965 in the name of E. A. Edwards et al, discloses a "super 8" film cartridge for motion picture cameras or the like wherein a coreless roll of motion picture film is positioned around (but not attached to) a stationary post in a supply chamber of the cartridge and is withdrawn from the chamber along a film path past an exposure aperture and is then wound onto a takeup core in a takeup chamber of the cartridge, the supply and takeup chambers being in substantially parallel planes and being co-axially disposed with respect to each other. As is well known in the art, the film supply roll in such a cartridge is coreless and therefore is subject to clockspringing, i.e., successive convolutions of the film roll may be displaced radially outwardly relative to the central axis of the roll due to the tendency of a coiled, unsecured film supply roll to unwind. It also is known to modify such cartridges to provide for recording of sound onto the film in the cartridge simultaneous with exposure of the various film frames to scene light. In this regard, reference is made to U.S. Pat. No. 3,442,580 issued May 16, 1969 in the name of A. Winkler. When such cartridges are loaded with film containing a magnetic stripe for recording of sound, the magnetic stripe typically is placed along one side edge of one surface of the film and adjacent the central area of the film where photographic emulsion on the other surface is exposed to scene light. A balance stripe is typically provided on the other side edge of that one surface of the film beside perforations in the film. Both the recording stripe and the balance stripe project from the surface of the film. Because the walls defining these supply chambers in the cartridge are spaced apart by a distance somewhat greater than the width of the film roll to minimize frictional contact therebetween, the various film convolutions can sidestep in a random manner by a distance which allows a stepped convolution to overlap one of the stripes (e.g., the sound stripe) and contact one wall of the supply chamber, particularly where the film has clocksprung as a result of handling during packaging, shipping, etc. As noted before, this results in excessive frictional contact by the supply roll of film and at least one wall of the film supply chamber, and may result in unsatisfactory exposure of film in a camera. Attempts to force the stepped convolutions to return to their original position by surface formations on the walls of the cartridge chamber generally are not satisfactory due to the frictional contact between the stepped convolutions of the film and the adjacent convolutions.

SUMMARY OF THE INVENTION

It is an object of the present invention to provide a film cartridge which overcomes the difficulties encountered as a result of stepping of film in a supply roll of film in a cartridge.

It is another object of the invention to provide a film cartridge which prevents stepping of a supply roll of film in an axial direction irrespective of whether the film has undergone any clockspringing radially outward from the axis of the cartridge prior to use in a camera.

It is a further object of the invention to provide a film cartridge for motion picture film or the like in which the stepping problem prior to use is eliminated, while at the same time providing for unhindered rotational movement of the film when the film cartridge is inserted in a camera or similar device.

A still further object of the invention is to provide a film cartridge for motion picture film or the like having a sound stripe thereon, which film is particularly subject to stepping, in which any stepping movement of the film prior to use in a camera is prevented.

In accordance with the present invention, a film cartridge is provided with a removable pull tab which occupies the space available between the film in the supply chamber and a side of the supply chamber, thus preventing any stepping in the axial direction. The pull tab is removed prior to use of the film cartridge in a camera, thereby permitting free rotation of the film in use in a camera.

The invention and its objects and advantages, will become more apparent in the detailed description of the preferred embodiments set forth below.

BRIEF DESCRIPTION OF THE DRAWINGS

In the detailed description of the preferred embodiments of the invention presented below, reference is made to the accompanying drawings, in which:

FIG. 1 is a perspective view of a cartridge constructed in accordance with the present invention, with the relative positions of a pull tab and a film strip within a supply chamber shown in broken lines.

FIG. 2 is an enlarged perspective view of a portion of a film strip of the type loaded in the cartridge shown in FIG. 1;

FIG. 3 is an enlarged fragmentary view of a portion of the supply side of a film cartridge showing certain convolutions of film stepped in a manner which is considered undesirable;

FIG. 4 is a fragmentary cross section view of the cartridge shown in FIG. 1, particularly illustrating the manner in which a pull tab occupies the space between a roll of film and a supply chamber wall.

DESCRIPTION OF THE PREFERRED EMBODIMENTS

Because photographic apparatus is well known, and because the nature of the present invention is independent of any particular camera or other photographic apparatus structure, it is understood that apparatus not specifically shown or described herein are selectable from those known in the art.

Referring now to the drawings in detail, a film cartridge according to the present invention is generally designated 10 and is adapted to be loaded with film F.

As best shown in the FIGS. 2 and 3, the film F may be a film strip having a stripe 12 of magnetic recording material along one side edge of one surface of the film and a balance stripe 14 along the other side edge of the same surface of the film. The balance stripe is located adjacent to a plurality of perforations 16 in the film strip, and the light sensitive emulsion on the film typically is located on the opposite (lower) surface of the film.

As noted earlier, sound film of the type shown in FIG. 2 when loaded in a super 8 film cartridge as disclosed in the beforementioned Edwards et al patent, tends to clockspring, and this allows the convolutions of the film to sidestep randomly. In part, the clockspringing of the supply roll of film in the cartridge, and thus the resulting stepping of the various convolutions, occurs because the film in the supply chamber of the Edwards et al cartridge is a "coreless" roll of film, i.e., it is not attached to a reel, core or the like and therefore the inner convolution of film is not held stationary. FIG. 3 illustrates the stepping condition that can result from loading of film of the type shown in FIG. 2 in a cartridge as disclosed in the Edwards et al patent. Thus FIG. 3 illustrates a coreless roll 20 of film F located in a supply chamber 22 of the film cartridge. The inner end F' of the film is unattached and loosely positioned around a stationary supply post 24. The film convolutions designated F1 and F2 have become stepped and the lower portions thereof frictionally contact the sound stripe 12 of the film convolutions radially inwardly of the convolutions F1 and F2. The film roll 20 rests on an antifriction disc 26 which may be of the type disclosed in the commonly assigned U.S. Pat. No. 3,208,685 issued Sept. 28, 1965 in the names of E. A. Edwards and A. J. Tucker and entitled Anti-Friction Disk for Strip Material Cartridge. Because of the anti-friction disc, the film roll can rotate relatively freely with respect to the bottom or inner wall 28 of the supply chamber in the cartridge. However, the stepped convolutions of film F1 and F2 contact the inner surface of the upper wall or cover 30 of the supply chamber and produce a friction force when the supply roll is rotated (as is necessary during advancement of film in a camera). This force increases the load required for proper advancement of film and, as noted earlier, can result in improper exposure of film.

To the extent that cartridge 10 of the present invention incorporates the same or similar structures as described in connection with FIG. 3, the same reference numerals have been used to designate the same parts of the cartridge. Referring now to FIGS. 1 and 4, the sound cartridge 10 illustrated in the drawings includes a sound aperture 32 which opens to the bottom and backside of the cartridge and is adapted to receive certain elements of sound apparatus in a camera. Film in supply chamber 22 is unwound in a counterclockwise direction and threaded past an exposure aperture 34 in the cartridge for exposure to scene light in a camera. The film is then advanced through the sound aperture 32 in the cartridge for recording of sound onto the film. Then the film is fed into a takeup chamber 36 located below wall 28 in a plane parallel to the plane of the supply chamber. As is well known in the art, film in the takeup chamber can be wound onto a core (not shown) that is substantially coaxial with the supply roll and post 24 in the supply chamber. It is usual for such film cartridges to also have a locating notch 46 to maintain the cartridge in the desired position in a camera.

In accordance with the present invention means are provided for occupying the space available in a film cartridge supply chamber between the roll of film in the supply chamber and the inside wall of the cartridge cover, thereby eliminating the problem of film stepping. More specifically, a flexible removable pull tab 17 is provided in film cartridge 10 which prevents stepping of film F by occupying the space 18 between the film F and the supply cover 30. A preferred configuration for the pull tab is the bifuracted or forked-Y-shape configuration shown in FIG. 1, in which the two branches or arms of the pull tab 17 fit on either side of supply post 24 and effectively prevent film stepping over the whole area of the supply chamber. Pull tab 17 also includes a tab end 17a which extends outwardly of cartridge 10 through exposure aperture 34 as shown. When the film cartridge 10 is to be inserted in a camera or similar device, the operator thereof simply removes the flexible pull tab 17 from the cartridge 10 by pulling on tab portion 17a. With the pull tab 17 removed, unhindered rotation of the film in the supply chamber is permitted, so the film cartridge can then be used in a camera or similar device.

The invention has been described in detail with particular reference to preferred embodiments thereof, but it will be understood that variations and modifications can be effected within the spirit and scope of the invention.

What is claimed is:

1. In a film cartridge having walls defining a supply chamber for a roll of film or the like having a tendency to become sidestepped in an axial direction, the improvement comprising:
 a flexible pull tab received in a space between a roll of film in the supply chamber and a wall of the supply chamber so as to prevent sidestepping of the film, said pull tab having an end portion which extends toward the exterior of the cartridge, and said pull tab being removable through an opening in said cartridge.

2. In a film cartridge as in claim 1, the further improvement wherein the wall of the supply chamber comprises the cartridge cover.

3. In a film cartridge as in claim 1, the further improvement wherein said end portion extends through an exposure aperture of the film cartridge.

4. In a film cartridge as in claim 1, the further improvement wherein the pull tab comprises a bifurcated portion which extends on opposite sides of a supply post in the supply chamber, and said end portion extends from an exposure aperture of the film cartridge.

* * * * *